United States Patent [19]

Albizzati

[11] Patent Number: 4,804,798

[45] Date of Patent: Feb. 14, 1989

[54] PROCESS FOR THE POLYMERIZATION OF ALPHA-OLEFINS OR OF THEIR MIXTURES WITH MINOR AMOUNTS OF ETHYLENE, BY MEANS OF CATALYSTS COMPRISING SOLID COMPONENTS OR PRECURSORS AND SUCH COMPONENTS, IN THE FORM OF MICROSPHEROIDAL PARTICLES

[75] Inventor: Enrico Albizzati, Novara, Italy

[73] Assignee: Montedison S.p.A., Milan, Italy

[21] Appl. No.: 78,083

[22] Filed: Jul. 27, 1987

[30] Foreign Application Priority Data

Jul. 31, 1986 [IT] Italy ................... 21334 A/86
Nov. 27, 1986 [IT] Italy ................... 22468 A/86

[51] Int. Cl.$^4$ .............................................. C07C 2/22
[52] U.S. Cl. ..................... 585/512; 502/156; 502/169; 502/171; 502/126; 526/125; 583/511
[58] Field of Search ............... 585/502, 506, 512, 600, 585/514; 502/152, 156, 169, 171, 172, 126; 556/5; 526/348, 124, 125

[56] References Cited

U.S. PATENT DOCUMENTS

| | | | |
|---|---|---|---|
| 3,953,414 | 4/1976 | Galli et al. | 526/348 |
| 4,012,574 | 3/1977 | Jones et al. | 526/352 |
| 4,231,896 | 11/1980 | Malpass | 502/152 |
| 4,290,918 | 9/1981 | Bayer et al. | 556/51 |
| 4,342,708 | 8/1982 | Sakurai et al. | 502/156 |
| 4,383,119 | 5/1983 | Pullukat et al. | 502/152 |
| 4,490,475 | 12/1984 | Bailly et al. | 502/152 |
| 4,547,477 | 10/1985 | Malpass et al. | 502/156 |
| 4,581,342 | 4/1986 | Johnson et al. | 502/156 |
| 4,617,408 | 10/1986 | Nestler et al. | 502/152 |
| 4,626,608 | 12/1986 | Scher et al. | 570/134 |
| 4,698,393 | 10/1987 | Jansons et al. | 525/242 |
| 4,728,705 | 3/1988 | Nestlerode et al. | 526/125 |
| 4,736,004 | 4/1988 | Scherer et al. | 526/206 |
| 4,748,221 | 5/1988 | Collomb et al. | 526/125 |
| 4,754,006 | 6/1988 | Murata et al. | 526/125 |

FOREIGN PATENT DOCUMENTS

| | | | |
|---|---|---|---|
| 0007647 | 2/1980 | European Pat. Off. | 526/348 |
| 0045976 | 2/1982 | European Pat. Off. | 502/119 |
| 0045977 | 2/1982 | European Pat. Off. | 502/119 |
| 0083074 | 7/1983 | European Pat. Off. | 502/119 |
| 2434180 | 3/1980 | France | 502/125 |

OTHER PUBLICATIONS

CA83(24)194110t, Jul. 24, 1975.

Primary Examiner—Anthony McFarlane
Attorney, Agent, or Firm—Stevens, Davis, Miller & Mosher

[57] ABSTRACT

Polymers of alpha-olefins of formula $$R-CH=CH_2$$

wherein R=alkyl of from 1 to 6 C atoms, or of their mixtures with minor amounts of ethylene are obtained by adopting catalysts comprising:

(A) a solid component obtained by treating an emulsion (a) in a perfluoropolyether liquid of a liquid compound of magnesium, of titanium or of another transition metal, either liquid or in solution, with possibly using an electron-donor compound, with (b) a reducing and/or halogenating agent capable of forming an insoluble solid product, after which, if such a product is a precursor of the catalytic components, it is treated with a tetravalent-titanium halide, or with a halide of another transition metal;
(B) an aluminum-alkyl compound;
(C) an outer electron-donor compound (c).

8 Claims, No Drawings

PROCESS FOR THE POLYMERIZATION OF ALPHA-OLEFINS OR OF THEIR MIXTURES WITH MINOR AMOUNTS OF ETHYLENE, BY MEANS OF CATALYSTS COMPRISING SOLID COMPONENTS OR PRECURSORS AND SUCH COMPONENTS, IN THE FORM OF MICROSPHEROIDAL PARTICLES

BACKGROUND OF THE INVENTION

In the art, several processes are known for the preparation of homo- or copolymers of alpha-olefins, with the use of solid catalytic components, comprising, as their essential components, halogenated compounds of magnesium, titanium, and an electron-donor compound.

The polymers obtained by means of such catalysts are generally in powder form, with a more or less wide distribution of particle dimensions.

The use of such catalysts finds a certain limitation from the view point of the separation and of the carriage of the polymers, of the conditions of suspension polymerization, of stabilization, or of recovery of the polymer in the gas-phase polymerization processes.

The need is thus largely felt of having available catalysts endowed with a high activity, which allow polymers to be obtained in the form of particles having a narrow granulometric distribution, and furthermore endowed with a high bulk density.

Various methods have been proposed in the art for preparing such catalysts. One of them is disclosed, e.g., in European patent application No. 79102780.8, in the same Applicant's name, and consists in reacting a compound of Ti with a support consisting of, or comprising, an anhydrous Mg halide, in the form of spherical particles having an average diameter of 1–100 microns, a surface area greater than 500 m$^2$/g, and a porosity higher than 0.5 cm$^3$/g, and possibly also with an electron-donor compounds. A solid catalytic component is thus obtained which, when used with Al-organometallic compounds, yields polymers in the form of particles having a narrow granulometric distribution, and endowed with high free-flowing properties. But in that case the technology is rather complex.

Another method is disclosed in European patent application No. 83074 in the same Applicant's name, and consists in preparing an emulsion, in a silicone oil or in a hydrocarbon, of an immiscible liquid comprising a complex of MgCl$_2$ with AlCl$_3$ and with toluene and in reacting such an emulsion with Al-trialkyl, to precipitate a solid catalytic component. The catalysts obtained from such catalytic components yield polymers in the form of particles with a narrow distribution of particle sizes, but with a not yet satisfactory bulk density.

THE PRESENT INVENTION

The present Applicant has found now that obtaining polymers of alpha-olefins, of general formula CH$_2$=CHR (R=1–6 C alkyl groups) or their copolymers with ethylene, with high yields, as particles with a narrow distribution of particle sizes and endowed with a high apparent density, is possible, by using catalysts comprising (A) a solid component prepared under particular conditions, (B) an aluminum alkyl compound, and (C) an electron-donor compound. Such particular conditions comprise reacting (a) an emulsion obtained by emulsifying compounds, liquid under the emulsifying conditions, selected from the class consisting of compounds of magnesium and compounds of titanium or another transition metal, alone or combined with each other, or solutions of said compounds, alone or combined with each other, in a perfluoropolyether oil which is not miscible with the solvent of said solutions, with (b) a reducing and/or halogenating agent capable of precipitating such compounds in the form of a solid product containing at least one Mg-halogen bond and/or one transition metal-halogen bond, in case in the emulsion compounds of Mg and/or of a transition metal are present.

As the Mg compounds to be used in the perfluoropolyether emulsion for the process of the invention, all of those magnesium compounds are suitable, which are liquid at the emulsifying temperature, or which are dissolved in a solvent not miscible with the perfluoropolyether, and are able to give rise, by reaction with the (b) precipitating agent, to compounds containing at least one Mg-halogen bond. As the titanium compounds, or compounds of other transition metals, tetrahalides, alkoxides or halo-alkoxides of tetravalent titanium; VOCl$_3$; vanadium acetylacetonates are preferably used.

To that class of Mg compounds, those compounds belong, which have the general formula:

(I) Mg(OR$_1$)$_{2-n}$X$_n$, wherein R$_1$=hydrocarbon radical of from 1 to 12 C atoms either unsubstituted or substituted with halogen; X is a halogen, preferably chlorine; n=an integer comprised within the range of from 0 to 2, with the extremes being included. Examples of representative compounds of such formula are: MgCl$_2$, MgBr$_2$, MgI$_2$, Mg(OC$_2$H$_5$)Cl, Mg(OC$_6$H$_5$)Cl, Mg(OC$_8$H$_{17}$)Cl, Mg(OCH$_2$C$_6$H$_5$)Cl, Mg(OC$_3$H$_6$Cl)Cl, Mg(OC$_3$H$_5$Cl$_2$)Cl, Mg(O-cyclohexyl)Cl, and the mixtures of such compounds; or (II) Mg(OR$_1$)$_{m-n}$(R$_2$)$_n$, wherein R$_1$ has the above-disclosed meaning, R$_2$ can be a hydrocarbon radical containing from 1 to 12 C atoms equal to, or different, from R$_1$, m and n are integers comprised within the range of from 0 to 2, with the extremes being included; or (III) MgX$_2$.nTi(OR$_1$)$_4$, wherein X=halogen, preferably chlorine, R$_1$ has the meaning as described in formula (I), n=integer greater than or equal to 2, but preferably not higher than 3;

(IV) Complexes of MgX$_2$ (wherein X has the abovesaid meaning) with electron-donor compounds.

As it has already been mentioned aabove, the compounds of magnesium, titanium and other transition metals can be used, for the preparation of their emulsion in perfluoropolyether, in the form of a solution in one or more solvents. Such solvents should be not miscible with the used perfluoropolyether. Preferred solvents, in case of magnesium compounds, are the Ti alkoxides or halo-alkoxides of general formula (V) Ti(OR$_1$)$_{4-n}$X$_n$, wherein R$_1$ has the meaning as described in above formula (I), and is, in particular, an alkyl, aryl, aralkyl, cycloalkyl radical, optionally containing up to 3 substituent halogen atoms; X is a halogen, preferably chlorine, n is an integer comprised within the range of from 0 to 3, with the extremes being included.

Examples of such Ti compounds are Ti(O-iC$_3$H$_7$)$_4$, Ti(O-nC$_4$H$_9$)$_4$, Ti(O-iC$_4$H$_9$)$_4$, Ti(O-iC$_8$H$_{17}$)$_4$, Ti(O-CH$_2$C$_6$H$_5$)$_4$, Ti(O-C$_3$H$_6$Cl)$_4$, Ti(O-C$_3$H$_5$Cl$_2$)$_4$, Ti(O-C$_4$H$_9$)$_3$Cl, Ti(O-C$_4$H$_9$)$_2$Cl$_2$.

Also polymers of the compounds of general formula (V), with a polymerization degree of from 2 to 20, can be used. Mixtures of the above-said solvents with organic solvents, e.g., hydrocarbon solvents, can be used.

When the liquid Mg compound is able to react with the precipitating agent, so that it precipitates from the emulsion in the form of a solid compound containing at least one Mg-halogen bond, the presence of liquid Ti compounds in the emulsion is optional. When the Mg compound is not able to react with the precipitating agent, it is suitable to use in the emulsion a liquid Ti compound, able to bind itself to the Mg compound, and to react, in its turn, with the precipitating agent, yielding a solid product containing at least one Mg-halogen and Ti-halogen bond. In this second case, the Ti compound can act as the same solvent for the Mg compound. For example, in case as the Mg compound a dihalide is used, satisfactory results are obtained by using in the emulsion a Ti alkoxide, which forms a liquid complex with the Mg halide, capable of reacting with the precipitating agent. Such a Ti alkoxide can be one comprised in the above disclosed general formula (V). When operating in the absence of Ti compounds, or of compounds of other transition metals, in the emulsion, the solid product obtained after the reaction with the halogenating and/or reducing agent, which contains at least one Mg-halogen bond, is subsequently treated with a tetravalent-Ti halide or with a halide of another transition metal.

The perfluoropolyether oils herein used for preparing the emulsions of the invention are well-known products, wherein the perfluoropolyether structure is generally formed by recurring —C$_2$F$_4$O— and/or —C$_3$F$_6$O— units, possibly also comprising —CF$_2$O— units.

Suitable perfluoropolyethers are in particular those which are in compliance with the following formulae, and have a viscosity comprised within the range of from 4 to 1500 cSt:

(A)

CF$_3$O—(C$_3$F$_6$O)$_m$(C$_2$F$_4$O)$_n$(CFXO)$_q$—CF$_3$ wherein X is equal to —F or —CF$_3$; m, n and q are integers; the m/n+q ratio is comprised within the range of from 1 to 50 and n/q is comprised within the range of from 1 to 10; the oxyperfluoroalkylene units are randomly distributed along the chain.

The preparation of these compounds is disclosed in U.S. Pat. No. 3,665,041.

(B)

C$_3$F$_7$O(C$_3$F$_6$O)$_m$—R$_f$ wherein R$_f$ is C$_2$F$_5$ or C$_3$F$_7$ and m is an integer greater than 2.

The preparation of these compounds is disclosed in U.S. Pat. No. 3,242,218.

(C)

CF$_3$O(C$_2$F$_4$O)$_p$(CF$_2$O)$_q$—CF$_3$ wherein p and q are integers equal to, or different from each other, and the p/q ratio is comprised within the range of from 0.5 to 1.5; the oxyperfluoroalkylene units are randomly distributed along the chains.

The preparation of these compounds is disclosed in U.S. Pat. Nos. 3,715,378 and 3,665,041.

(D)

CF$_3$O(C$_3$F$_6$O)$_m$(CFXO)$_n$—CF$_2$Y wherein X and Y, equal to or different from each other, are —F or —CF$_3$; m and n are integers and the m/n ratio varies within the range of from 5 to 40. The oxyperfluoroalkylene units are randomly distributed along the chain.

The preparation of these compounds is disclosed in U.K. Pat. Nos. 1,104,481 and 1,226,566.

(E) The perfluoropolyethers with oxethanic structure as disclosed in Italian patent application No. 19494 A/85.

(F)

R'$_f$O(CF$_2$CF$_2$O)$_p$R$_f$ wherein R$_f$ and R'$_f$, equal to or different from each other, are —CF$_3$ or —C$_2$F$_5$ and p is an integer such that the viscosity is within the previously indicated limits. Products of this type are disclosed in U.S. Pat. No. 4,523,039.

(G)

R'$_f$O(CF$_2$CF$_2$CF$_2$O)$_s$R$_f$ wherein R$_f$ and R'$_f$, equal to or different from each other, are —CF$_3$ or —C$_2$F$_5$ and s is an integer such that the viscosity is within the previously indicated limits. Products of this type are disclosed in European patent application No. 148,482.

Usually, the perfluoropolyether used to the purpose of forming the emulsion has a viscosity comprised within the range of from 4 to 200 cSt.

Although the process is normally carried out with the emulsion being at room temperature, operating at a lower or higher than ambient temperature, e.g., at a temperature of from —30° to +90° C., is however possible.

The ratio, by volume, of the magnesium compound to the perfluoropolyether in the emulsion is comprised within the range of from 0.01 to 1.

The emulsion is preferably prepared in the presence of an emulsion stabilizer constituted by a perfluoropolyether having a functionalized terminal.

The perfluoropolyether having a functionalized terminal has preferably the following terminals:

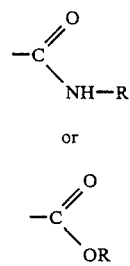

wherein R is a linear, branched or cyclic alkyl containing from 1 to 20 C atoms, or an alkylaryl containing from 7 to 20 C atoms; R may also contain heteroatoms, in particular O and/or Si atoms, and substituents, e.g., Cl.

Examples of suitable emulsion stabilizers are:

$$CF_3-(OC_3F_6)_n(OCF_2)_m-O-CF_2-COO-CH_2-\underset{\underset{CH_3}{|}}{CH}-CH_3 \quad (I)$$

$$CF_3-(OC_3F_6)_n(OCF_2)_m-OCF_2-COO-CH_2-CHOH-O-(CH_2)_3-Si(OMe)_3 \quad (II)$$

$$CF_3-(OC_3F_6)_n(OCF_2)_m-O-CF_2CO-NH-(CH_2)_3-Si(OEt)_3 \quad (III)$$

The amount of emulsion stabilizer is generally comprised within the range of from 0.01% to 5% by weight relatively to the perfluoropolyether, however any amounts allowing the emulsion to be obtained can be advantageously used in the process of the invention.

The emulsion can be prepared, e.g., by a strong stirring, e.g., by using an Ultraturrax stirrer.

The Mg compound can be used in the emulsion in the form of a complex with electron-donor compounds; however, electron-donor compounds can be added to the emulsion of Mg compound, before the treatment thereof with the (b) precipitating agent, to the purpose of obtaining suitable catalytic components for the preparation of catalysts to be used in the stereoregular polymerization of alpha-olefins. The preparation technique for such catalysts is well-known in the technical literature. Particularly suitable electron-donors contain in their molecule oxygen atoms, or sulphur, phosphorus or nitrogen atoms.

In particular, the following are mentioned: esters of oxygen-containing acids, the acid halides, the ketones, the aldehydes, the alcohols, the ethers, the thioethers, the amides, the lactons, the phosphines, the phosphoroamides, the silicon compounds, such as the silanic and siloxanic compounds.

Among esters, to exemplifying purposes the following are mentioned: the alkyl esters of aromatic, aliphatic or aromatic mono- or polycarboxy acids containing from 2 to 20 C atoms in general, in particular the mono- and polyesters of the saturated and unsaturated polycarboxy acids, the esters of the aromatic hydroxyacids, and in general those disclosed, as electron-donors, in published European patent applications Nos. 45976, 45977, in the same Applicant's name. Examples of such esters are methyl-, or ethyl-, butyl-, octyl-acetate, ethyl, or ethylphenyl-butyrate, ethyl-valerianate, phenyl-propionate, mono- and di-ethyl-succinate, ethyl-methyl, or ethyl-, propyl- or octyl-benzoate, ethyl-p-toluate, ethyl-p-anisate, diethyl-diisobutyl-malonate, diethyl-n-butyl-malonate, diethyl-n-dibutyl-malonate, diethyl-phenyl-malonate, diisobutyl-adipate, dioctyl-sebacate, the alkylmaleates, the alkyl-aryl-maleates, the alkyl- or aryl-alkyl-pivalates, the alkyl-acrylates and metacrylates, the phthalates, such as the isobutyl-, diisobutyl- or dioctyl- or neopentyl-phthalate, diethyl-phthalate, diphenyl-phthalate, benzyl-butyl-phthalate; diphenylcarbonate, ethyldiphenylacetate, isobutyl-benzoylacetate, 1,2-dihydroxy-diacetato-benzene, diisobutyl-2,3-naphthalene-dicarboxylate.

Among ethers, to exemplifying purposes the following are mentioned: the mono-, di-, tri- or tetra-ethers containing from 2 to 20 C atoms, such as diethylether, dibutylether, diisoamylether, dioctylether, dioxan, trioxan, tetrahydrofuran, ethyleneglycol-dimethylether, propylene oxide, epichlorohydrin, benzophenone.

Examples of other electron-donors which can be used are phosphites, such as triphenylphosphite, triphenylphosphine, 1,4-butanediol; $POCl_3$; acetyl alpha-methyl-alpha-phenyl chloride, benzoyl chloride, bromide and iodide, toluyl chloride, butyrolacton, and in general all of those as indicated in European patent applications Nos. 86471, 86472 and 86473 in the same Applicant's name. Furthermore, the silicon compounds and the heterocyclic compounds containing at least one nitrogen atom are indicated.

As the precipitating agents (b) to be used for the treatment of the emulsion, all of the halogenated compounds are suitable, which are capable of reacting with the compound of magnesium or of the transition metal contained in the emulsion to yield a solid compound containing at least one Mg-halogen bond, and/or at least one transition metal-halogen bond. In the case of emulsions containing Mg compounds, the useable compounds are generally halogenating agents capable of forming, in the reaction with Mg, Mg halides, or organometallic compounds, in particular aluminum-trialkyls, capable of decomposing the liquid Mg complex, with the formation of Mg halide. In case of transition metals, the precipitating agent is generally an organometal reducing agent.

Examples of halogenating compounds are the silicon compounds having the general formula:

$$SiR_xX_{4-x}$$

wherein
R = alkyl, aryl, aralkyl or alkoxy radical containing from 1 to 20 C atoms;
X = halogen, preferably chlorine, and $0 \leq x \leq 3$;
or the titanium compounds of general formula:

$$Ti(OR)_xX_{4-x}$$

wherein R, X and x have the above expressed meaning; or the aluminum compounds, of formula:

$$AlR_xX_{3-x}$$

wherein R and X have the above expressed meaning, and $0 \leq x \leq 2$.

To exemplifying purposes, among these compounds $SiCl_4$, $TiCl_4$, $AlEt_2Cl$ are mentioned.

The treatment of the emulsion with the precipitating (or halogenating) agent is carried out by using an amount of such an agent at least equal to the stoichiometrically necessary amount to obtain at least one Mg-halogen bond in the magnesium compound present in the emulsion, and/or to obtain at least the reduction by one unit of the valence of the transition metal, when a transition metal compound is present.

The treatment temperature is not critical; to exemplifying purposes, operating is possible at temperatures comprised within the range of from 20° C. to the boiling temperature of the precipitating agent. The treatment can be accomplished by adding the halogenating agent as such, or diluted in a hydrocarbon solvent, to the emulsion, or vice-versa.

After the reaction, the solid product is separated, washed and then, if it was obtained in the form of a precursor (i.e., if it was obtained from the emulsion without Ti compounds, or without any compounds of other transition metals, by using a precipitating agent different from a transition metal compound), it is treated with a tetravalent-Ti halide, or with a halide of a transition metal different from Ti, for the obtainment of the catalytic component. If desired, operating in the presence of an electron donor is possible.

The treatment can be accomplished also in the presence of a hydrocarbon, aromatic or halogenated solvent. The size of the catalytic component of the precursor is controlled by the stirring speed, by the viscosity of the polyperfluoroether liquid or of the liquid, or solution of, compound of Mg and/or of the transition metal. In particular, the size decreases with increasing stirring speed.

As the Al-alkyl compounds to be used as the (B) component of the catalyst in the process of the invention, mentioned are: Al-trialkyls, such as, e.g., AlEt$_3$, Al(i-Bu)$_3$, Al(i-C$_3$H$_7$)$_3$, AlEt$_2$H, and compounds containing two or more Al atoms bonded to each other through heteroatoms, such as:

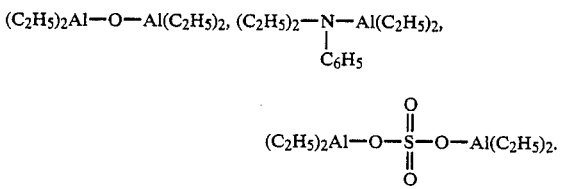

Also Al-alkyl compounds wherein Al atoms are bonded by means of such groups as SO$_4$ or SO$_3$ are suitable.

Al-alkyl compounds can be used as mixtures with Al-alkyl halides, such as AlEt$_2$Cl.

As the (C) components of the catalyst, all of the electron-donor compounds can be used, which can be present in the perfluoropolyethereal emulsion, and which have been mentioned above.

The catalysts of the invention are used for polymerizing the alpha-olefins by known methods, i.e., by carrying out the polymerization in the liquid phase, in the presence or in the absence of an inert hydroocarbon solvent, in the gas phase, or also combining, e.g., a phase of polymerization in liquid phase, with a phase in gas phase.

The temperature is generally comprised within the range of from 40° to 160° C., but preferably of from 60° to 90° C., with operating under atmospheric or higher than atmospheric pressure.

As the molecular weight regulator, either hydrogen or another molecular weight regulator of known type is used.

The following examples are supplied to the purpose of illustrating the present invention, without constituting a limitation thereof.

EXAMPLE 1

To a 1000-ml autoclave equipped with a magnetic-anchor stirrer and a dip tube connected, through a valve, to a 4000-mm long steel pipe of 2.4 mm of inner diameter, 300 ml of perfluoropolyether (denominated Epilden D1/LS by Montefluos S.p.A.), having a viscosity of 4 cSt, 40 ml of a liquid having the composition MgCl$_2$.2Ti(OC$_4$H$_9$)$_4$ (equivalent to 60 mM of Mg), 6 ml of anhydrous n-heptane and 10 mM of methyl-p-toluate (MPT) are charged. The mass is kept stirred at 400 rpm, and 10 minutes later an overpressure of 50 atm of N$_2$ is added. During a 60-seconds time, the emulsion contained in the autoclave is discharged, through the above described pipe, into a 1000-ml flask, containing 400 ml of TiCl$_4$, kept stirred. The whole operation is carried out at 20° C. The reaction mass is kept stirred in the flask for 10 minutes, and the suspension is then transferred into a reactor with a fritted filter, wherein it is allowed to react at 100° for 2 hours. TiCl$_4$ is filtered off, and an equal amount thereof is added, it being let react at 120° C. for 2 hours. The suspension is filtered and the filter panel is washed with portions of 300 ml of n-heptane at 90° C., until in the filtrate no chlorine ions are present any longer.

At the analysis, the obtained solid shows the following composition: Mg=16.1% by weight; Ti=2.95%; Cl=5.58%; MPT=9.0%.

The propylene polymerization test carried out by using 30 mg of the so obtained solid as the catalytic component gave the following results:
Polymer=240 g;
Yield=8.0 kg of PP/catalyst g;
Insolubles on extraction by n-heptane (I.I.)=93%;
$[\eta]$=1.60 dl/g
Flowability index (Flow)=20 seconds
Compacted apparent density (C.A.D.)=0.43 g/cc.

COMPARATIVE EXAMPLE 1

Example 1 is repeated without use of perfluoropolyether and hence the emulsifying step being omitted. At the analysis, the obtained solid shows the following composition: Mg=16.3%; Ti=3.1%; Cl=56.1%; MPT=9.3%.

The propylene polymerization test carried out by using 28 mg of the so-obtained solid as the catalytic component gave the following results:
Polymer=230 g
Yield=8.2 kg of PP/catalyst g.
I.I.=92.5%
$[\eta]$=1.80 dl/g
Flow=26 seconds
Compacted apparent density=0.31 g/cc.

The polymerization conditions used in the above examples are the following.

Five mmol of Al-triisobutyl were reacted at room temperature with 1.25 mmol of methyl p-toluate in 100 ml of h-heptane for 5 minutes; they were then contacted with a proper amount of the catalytic component prepared according to the examples.

Separately, 900 ml of n-heptane was introduced, under a nitrogen atmosphere, into a stainless-steel autoclave of 3000 ml of capacity, equipped with a magnetic-anchor stirrer and thermometer, and heated at the controlled temperature of 40° C., through which a stream of propylene was flown.

In the same way, the suspension of the catalytic component was then introduced. After sealing the autoclave, hydrogen was added up to a partial pressure of 0.2 atm; the temperature was then increased up to 70°, with at the same time propylene being fed, up to a total pressure of 7 atmospheres. Such a pressure was kept constant throughout the polymerization time by the monomer being continuously fed.

After four hours, the polymerization was discontinued, and the polypropylene was isolated by treatment with methanol and acetone, and was then dried.

What is claimed is:

1. Process for the polymerization of alpha-olefins of formula:

R—CH=CH$_2$ wherein R=alkyl radical of from 1 to 6 C atoms, or of their mixtures with minor amounts of ethylene, carried out in the presence of a catalyst comprising:
(A) a solid component obtained by reacting (a) an emulsion obtained by emulsifying compounds which are liquid under the emulsifying conditions, selected from the class consisting of compounds of magnesium and compounds of a transition metal, alone or in combination with each other, or solutions of compounds selected from compounds of magnesium and compounds of a transition metal, alone or in combination with each other, in a perfluoropolyether oil with which the solvent of said solutions is not miscible, with (b) an agent capable of precipitating such a compound in the form of a solid containing at least one Mg-halogen bond, or a transition metal-halogen bond, or both a Mg-halogen bond and a transition metal-halogen bond;
(B) an aluminum-alkyl compound; and
(C) an electron-donor compound.

2. Process according to claim 1, wherein the magnesium compound is in the form of a solution in a liquid titanium compound.

3. Process according to claim 1, wherein the Mg compound is characterized by the formula:

$$Mg(OR_1)_{2-n}X_n \quad (I)$$

wherein R$_1$=hydrocarbon radical of from 1 to 12 C atoms either unsubstituted or substituted with halogen; X=halogen, and n=an integer within the range of from 0 to 2.

4. Process according to claim 1, wherein the Mg compound is characterized by the formula:

$$Mg(OR_1)_{m-n}(R_2)_n, \quad (II)$$

wherein R$_1$=hydrocarbon radical of from 1 to 12 C atoms either unsubstituted or substituted with halogen; R$_2$=hydrocarbon radical containing from 1 to 12 C atoms equal to, or different from R$_1$, and m and n=integers within the range of from 0 to 2.

5. Process according to claim 1, wherein the Mg compound is characterized by the general formula:

$$MgX_2 \cdot nTi(OR_1)_4 \quad (III)$$

wherein X=halogen; R$_1$=hydrocarbon radical of from 1 to 12 C atoms either unsubstituted or substituted with halogen; and n=integer greater than or equal to 2.

6. Process according to claim 1, wherein the solvent of the magnesium compound comprises a liquid titanium compound of the formula:

$$TiO(OR_1)_{4-n}X_n \quad (IV)$$

wherein R$_1$=hydrocarbon radical of from 1 to 12 C atoms either unsubstituted or substituted with halogen; X=halogen; and n=integer within the range of from 0 to 3.

7. Process according to claim 5, wherein the Mg compound is an Mg halide.

8. A process as defined in claim 1, wherein the emulsifying step is carried out in the presence of an electron-donor.

* * * * *